United States Patent [19]

Drzewinski

[11] Patent Number: 5,248,732
[45] Date of Patent: Sep. 28, 1993

[54] BLENDS OF POLYETHERIMIDES, AROMATIC ALKYL METHACRYLATES AND POLYCARBONATES

[75] Inventor: Michael A. Drzewinski, Princeton Junction, N.J.

[73] Assignee: Enichem S.p.A., Milan, Italy

[21] Appl. No.: 891,181

[22] Filed: Jun. 1, 1992

[51] Int. Cl.$^5$ .................. C08L 79/08; C08L 69/00; C08L 33/10
[52] U.S. Cl. .................. 525/133; 525/148; 525/183; 525/433
[58] Field of Search ............ 525/133, 148, 183, 433

[56] References Cited

U.S. PATENT DOCUMENTS

| | | |
|---|---|---|
| 3,847,867 | 11/1974 | Heath et al. |
| 4,395,518 | 7/1983 | Giles, Jr. et al. ............ 525/180 |
| 4,548,997 | 10/1985 | Mellinger et al. ............ 525/425 |
| 4,673,708 | 6/1987 | Rock et al. ............ 525/66 |
| 4,906,696 | 3/1990 | Fischer ............ 525/148 |

FOREIGN PATENT DOCUMENTS

| | | |
|---|---|---|
| 0141347 | 5/1985 | European Pat. Off. |
| 0325719 | 8/1989 | European Pat. Off. |

OTHER PUBLICATIONS

Recent Advances in Mechanistic and Synthetic Aspects of Polymerization, pp. 79–100, T. E. Long, et al., "Controlled Synthesis of Various Poly(Alkyl Methacrylates) by Anionic Techniques".
Polymer Blends, Chapter 7, vol. 1, pp. 295–352, H. V. Oene, "Rheology of Polymer Blends and Dispersions".

*Primary Examiner*—David J. Buttner
*Attorney, Agent, or Firm*—Oblon, Spivak, McClelland, Maier & Neustadt

[57] ABSTRACT

Aromatic polyetherimides can be blended with aromatic alkyl methacrylate polymers to give transparent, single phase and completely miscible materials at all compositions. Such blends, which exhibit only one glass transition, are endowed with improved workability, ease of processing and toughness compared to the polyetherimide alone as well as improved heat distortion, modulus and tensile strength as compared to the methacrylate alone. Aromatic polycarbonates, which are ordinarily immiscible with aromatic polyetherimides, can be compatibilized into single phase blends after the addition of a polyaromatic alkyl methacrylate.

18 Claims, 1 Drawing Sheet

BLENDS OF POLYETHERIMIDES, AROMATIC ALKYL METHACRYLATES AND POLYCARBONATES

BACKGROUND OF THE INVENTION

1. Field of the Invention

This invention relates to thermodynamically miscible polymer blends consisting of: (I) an aromatic polyetherimide (PEI); (II) an aromatic alkyl methacrylate polymer (PAAM) such as polybenzyl or polyphenyl ethyl methacrylate; and, optionally, (III) an aromatic polycarbonate (PC).

2. Discussion of the Background

The term "thermodynamically miscible" is used in the art to define a polymer blend that is mixed on the molecular level so as to form a single, homogeneous phase which exhibits only one glass transition. In contrast, the term "mechanically compatible" is taken to mean that mixing of the polymers is on a small scale but larger than the molecular level. Furthermore, "mechanically compatible" implies that the multiple phases exhibit good adhesion to one another so as to yield good mechanical properties. Although both thermodynamically miscible and mechanically compatible blends exhibit good mechanical properties, thermodynamically miscible blends will generally be stronger, and only thermodynamically miscible blends are transparent, owing to their single phase nature.

Blends of aromatic polyetherimides (PEI) and acrylate polymers are known. Aromatic polyetherimides are typically transparent, amorphous thermoplastics which display a good balance of properties; most notable are their good electrical properties, resistance to creep, high tensile strength and high heat deflection. Their good thermal stability, low mold shrinkage and resistance to solvents, acids and bases make them potentially attractive engineering resins. Nevertheless, most polyetherimides suffer from poor processability, low impact strength and high production cost. As a matter of fact, many polyetherimides are not used directly but instead are formed in situ from the more tractable polyamic acid precursors. Thus, their utility is limited to films and coatings in some cases. Acrylic polymers on the contrary display excellent workability and often excellent transparency. However, they suffer from poor dimensional stability and heat distortion.

PEI/polyacrylate blends can result in resins with comparatively more satisfactory properties with respect to the individual components. Unfortunately, many of these polymers blends are not miscible, nor compatible over most compositions. Blends of polyacrylates and polyetherimides displaying improved impact strength and processability over the polyetherimide alone have been disclosed in U.S. Pat. No. 4,395,518 but these blends are limited to less than 30% by weight of the acrylate polymer and they are not transparent or thermodynamically miscible. Similarly, EP Appl. 141,347 describes homogeneous blends of polyetherimides with acrylic elastomers that are clear and transparent only when the polyacrylate component is limited to less than 15 wt. %. High levels of such acrylate polymers in polyetherimides gives rise to poor processing characteristics and properties due to delamination of the part. Delamination is a direct result of the poor compatibility between the polymers, as is described in U.S. Pat. No. 4,673,708.

Blends of Ultem 1000 polyetherimide (General Electric) with polymethyl methacrylate or polyethyl methacrylate have been studied by the present inventor and found to exhibit two glass transitions when measured by differential scanning calorimetry (DSC), as expected (See Comparative Examples 1 and 2 below). Compression molded films of these blends are opaque and brittle, typical behavior of an incompatible mixture. However, if the methacrylate polymer contains aromatic alkyl ester groups, such as polybenzyl methacrylate, then thermodynamically miscible mixtures with PEI can be obtained. In addition, it has been discovered that polyaromatic alkyl methacrylates can be used to compatibilize PEI and aromatic polycarbonate resins.

Aromatic polycarbonates, particularly bisphenol A polycarbonate, also exhibit relatively good dimensional stability, transparency and stiffness as well as very good impact strength. Nevertheless, PC does have drawbacks such as poor scratch resistance, poor long term U.V. resistance and stress birefringence which have to be dealt with in demanding optical applications. Furthermore, typical polycarbonates, such as those made from bisphenol A, do not meet many local and federal requirements for flame retardance.

PEI/PC blend compositions result in materials with comparatively better properties with than those of the individual, single components. Blends of PEI and PC disclosed in U.S. Pat. No. 4,548,997 exhibit higher heat stability, higher heat distortion resistance, improved flexural strength and tensile strength over the PC component alone, as well as improved impact strength over the associated PEI component. In addition, the blends exhibit increased flame retardance as the level of PEI is increased in the mixtures. Unfortunately, the two materials are not miscible and the binary blend must be processed at high temperatures comparable to the processing of PEI alone. As a result of this high processing temperature, various undesirable reactions can occur including transpolymerization, oxidation, chain scission and other forms of degradation. Furthermore, the compatibility of the PEI and PC in U.S. Pat. No. 4,548,997 is also debated since it is stated that PEI cannot be blended, only mixed, with aromatic polycarbonates since two distinct glass transitions (Tg) are obtained unless the undesirable transpolymerization reaction occurs. Unfortunately, the resulting material formed by the transpolymerization reaction of PEI and PC has undesirable impact resistance and solvent resistance, according to EP 325,719 .

Therefore, the task existed of finding a PEI/PC blend which exhibits the following desirable characteristics: better average properties than those of the individual components; 2) lower processing temperature, especially in regard to PEI, so as to avoid undesirable side reactions; 3) absence of the transpolymerization side product which simulates miscibility but which does not possess the desirable properties; and 4) thermodynamic miscibility throughout the whole composition range so as to ensure transparency.

PEI/PC blends with more satisfactory properties over those of the individual components have been disclosed in the above-mentioned U.S. Pat. No. 4,548,997; however, such blends do not display lower processing temperatures over those of the single components nor are the blends monophasic with one Tg (thermodynamically miscible) except if the undesired transpolymerization product forms.

PEI/PC blends with lower processing temperatures over those of the single components have been disclosed in U.S. Pat. No. 4,673,708. This improvement in processing temperature has been achieved by means of the addition of a minor amount (less than 5 weight %) of an acrylic rubber. The declared intent of this patent, however, was to improve the impact strength of the PEI/PC blend. Furthermore, a single phase mixture was not obtained by the use of such an acrylic modifier. It is further stated in U.S. Pat. No. 4,673,708 that additional amounts of this acrylic rubber cause severe incompatibility among the components resulting in delamination of a molded part.

EP 325,719 discloses that the use of a phosphorous type stabilizer in a PEI/PC blend inhibits the undesirable transpolymerization side product but that the mixture remains two phase. Moreover, such blends neither display the required lower processing temperatures nor demonstrate transparency owing to the immiscibility of the components.

Accordingly, there is a need for transparent and easily processable polymer blends containing aromatic polyetherimides and polycarbonates. It has been found that aromatic alkyl methacrylate polymers have a high degree of compatibility with PEI over the entire compositional range, so as to overcome the deficiencies discussed hereinabove and provide single phase alloys with desired properties ranging from that of the pure polyetherimide to that of the polyacrylate. I have also discovered that PEI and polycarbonate will form a single-phase mixture in the presence of at least 20 wt. % of an aromatic alkyl methacrylate polymer, while as little as 10% PAAM can dissolve and plasticize PEI and PC simultaneously, resulting in a shift in Tg of both engineering resins and allowing a reduced processing temperature.

SUMMARY OF THE INVENTION

Accordingly it is an object of this invention to provide a thermoplastic blend composition which is transparent, clear, monophasic and mechanically compatible consisting of mixtures of aromatic polyetherimides and aromatic alkyl methacrylate polymers.

It is another object of this invention to prepare such blends so that the two polymers are thermodynamically miscible in all proportions and therefore constitute a high strength, transparent, single phase alloy at all compositions.

It is another object of this invention to provide thermoplastically processable compositions which are transparent, single phase materials over the whole range of compositions and which contain an aromatic polyetherimide (PEI), an aromatic polycarbonate (PC) and at least 20% by weight of an aromatic alkyl methacrylate.

Another objective is that the above mentioned blends exhibit more satisfactory properties with a lower processing temperature compared to those of the single, individual engineering plastics. Furthermore, this invention provides for thermodynamically miscible PEI/PC blends which do not undergo the undesirable transpolymerization side reaction during processing.

DETAILED DESCRIPTION OF THE PREFERRED EMBODIMENTS

Figure 1:
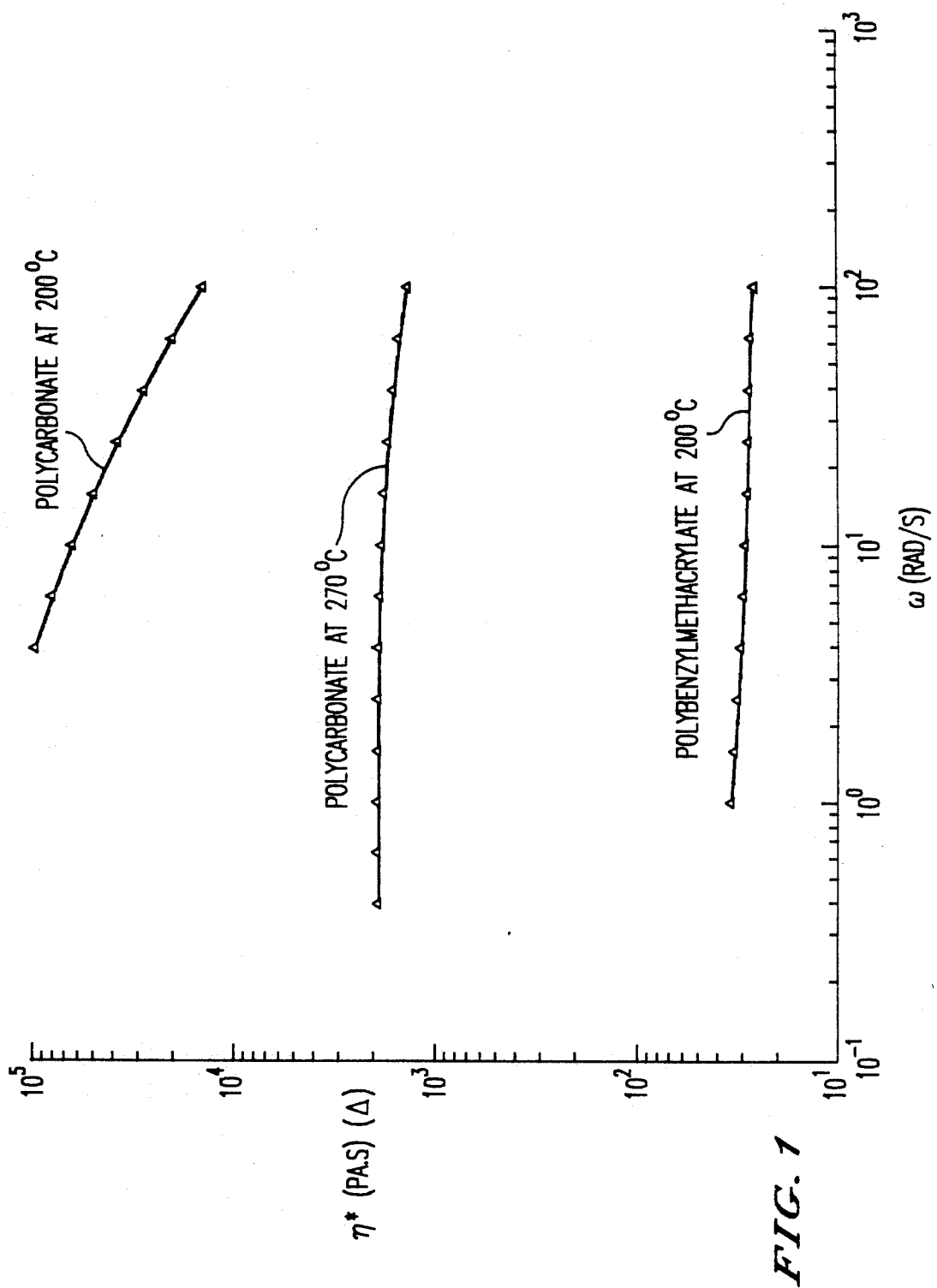
FIG. 1 shows melt rheological curves for polycarbonate and polybenzylmethacryate at fixed temperatures.

The incorporation of an aromatic group slightly detached from the polymer backbone in the PAAM component is the key factor in achieving miscibility in mixtures of PEI and PC. The above mentioned objectives can be achieved with thermodynamically miscible blends consisting of: (I) 1 to 99 weight % of one or more aromatic polyetherimides (PEI) with the general formula:

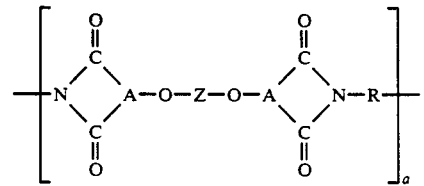

where (a) represents an integer greater than 1, preferably in the range of 10 to 10,000 or more;

O-A is a phenol or naphthyl group selected from

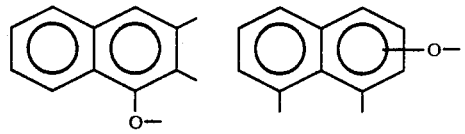

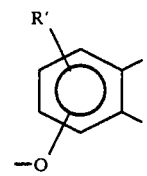

wherein $R^1$ is hydrogen, $C_1$-$C_6$ alkyl or $C_1$-$C_6$ alkoxy;

Z is a radical of the general formula:

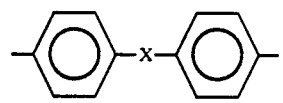

where X is $C_1$-$C_6$ straight or branched alkyl, carbonyl, sulfonyl, oxygen or sulphur group; and R is a divalent organic radical selected from $C_6$-$C_{20}$ aromatic, $C_1$-$C_6$-alkyl aromatic, biphenyl, phenyl ether and phenyl sulfide. A commercially available polyetherimide of the following structure is known as Ultem 1000, available from General Electric:

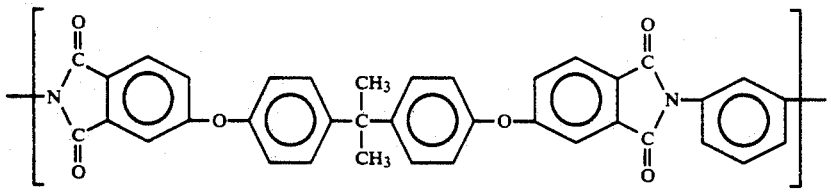

Other polyetherimides which can be used are described in U.S. Pat. Nos. 4,395,518 and 3,847,867;

Component (II) is 99 to 1 weight % of at least one aromatic alkyl methacrylate polymer (PAAM) of the formula:

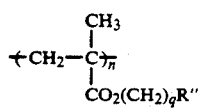

where q is an integer of 1 to 4, R" is a phenyl group and n is an integer between 10 and 30,000, preferably between 100 and 10,000. When q is 1 or 2, equating to polybenzyl methacrylate and polyphenyl ethyl methacrylate, respectively, preferred structures are obtained. Surprisingly, the polymer blends in accordance with this invention are thermodynamically miscible and mechanically compatible over the entire compositional range. Compositions containing more than 10 weight % of (I) or (II), respectively, are preferred.

PEI/PAAM blends according to this invention are clear, transparent and mechanically sound, in marked contrast to the prior art PEI/polyacrylate blends mentioned above, which are opaque and/or delaminated. Obviously the particular characteristics of a PEI/PAAM blend are dependent on the choice and level of components in the blend, varying from those of the pure polyetherimide to those of the pure polyaromatic alkyl methacrylate.

Generally, PEI/PAAM blends can be made at will to achieve a desired set of properties within the range of the component properties. Higher amounts of PEI in the blend yields a material with higher mechanical properties such as tensile strength and creep resistance; also higher thermal properties like heat deflection and dimensional stability. Higher proportions of the PAAM, on the other hand, produce a blend with better processability, workability and ductility. Thus, blends can be practically produced to overcome deficiencies of either the polyetherimide or the polyaromatic alkyl methacrylate while producing transparent, single phase materials at all compositions.

Blends of polyetherimides and aromatic alkyl methacrylates constitute a new class of polymer alloys which have numerous applications owing to their transparency and more favorable mechanical and thermal properties compared to the respective individual components or mechanical mixtures thereof. They can be used for example in the packaging industry (films, coatings, containers, etc.) where similar materials have been previously used but in applications requiring better thermal, mechanical and/or optical properties, such as in microwave cookware. Other applications for these blends are in the manufacture of articles in which excellent thermal, electrical and flame retardant properties are required, such as for the automotive or electrical industries. Still another potential use is for medical apparatuses since these materials can be repeatedly sterilized.

The polyaromatic alkyl methacrylates (PAAM) of this invention can be produced by a number of synthetic methods including various free radical, ionic and coordination techniques (bulk, suspension, solution, dispersion, emulsion, etc.). Azo compounds such as azobisisobutyronitrile, or peroxides such as dibenzoyl peroxide, or redox systems can be used as radical polymerization initiators. The products typically have number average molecular weights in the range of 10,000 to 2 million, more preferably within the range of 20,000 to 300,000, although this is not critical to the object of this invention. Preferred materials include polybenzyl methacrylates available from Scientific Polymer Products or Polysciences, Inc. having a molecular weight of about 70,000. Polyphenyl ethyl methacrylate can also be obtained from Scientific Polymer Products at a molecular weight of about 190,000. When produced by free radical polymerization processes the weight average molecular weights are in the range of 1.8-2.4 times larger than the number average molecular weight value.

It is also possible to achieve the above mentioned objectives with a thermodynamically miscible ternary blend consisting of:

1) an aromatic polyetherimide (PEI)
2) an aromatic polycarbonate (PC); and
3) at least 20 wt. % (based on the total weight of PEI+PC) of an aromatic alkyl methacrylate polymer (PAAM) as defined above.

Surprisingly, the polymer blends of this invention can be made miscible over a wide range of compositions, however the most practically interesting blends contain more than 50 wt. % of a total of PEI and PC. The respective amounts of PEI and PC can vary from 1:99 to 99:1% by weight; preferably 1:9 to 9:1.

Suitable polycarbonates are aromatic homo- or copolycarbonates and mixtures thereof. Aromatic polycarbonates are produced by reacting di-(monohydroxyaryl)-alkanes, dihydroxybenzenes and substituted derivatives thereof with derivatives of carbonic acid such as carbonic acid diesters, phosgene, bis-chloro-carbonic acid esters of di-(monohydroxyaryl)-alkanes, the bis-chloro-carbonic acid esters of dihydroxybenzenes and substituted derivatives thereof. These polymers can be manufactured by known processes as described in U.S. Pat. No. 4,548,997.

Aromatic polycarbonates are represented by the formula

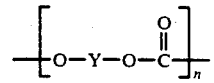

wherein Y is a radical of formula

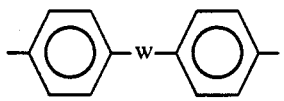

wherein W is $C_1-C_6$ straight or branched alkyl, carbonyl, sulfonyl, oxygen, sulfur or single bond, and n is an integer between 10 and 30,000, preferably between 100 and 10,000. Examples of Y include 2,2-bis(4-hydroxyphenyl)propane, bis-(4-hydroxyphenyl)methane, 2,2-bis(4-hydroxy-3methylphenyl)propane and 4,4-bis(4-hydroxyphenyl)heptane.

The preferred polycarbonates are produced from 2,2-bis(4-hydroxyphenyl)-propane (bisphenol A), such as the commercial Makrolon (Mobay Corporation) or Lexan (General Electric Corporation), and typically have number average molecular weights of at least 10,000 and preferably from 20,000 to 100,000.

Aromatic polycarbonates are typically prepared using a molecular weight regulator, an acid acceptor and a catalyst. The molecular weight regulators which can be employed include phenol, cyclohexanol, methanol and para-tert-butylphenol. The acid acceptor can be either an organic or an inorganic base. Suitable organic bases include alkyl and aromatic amines such as pyridine, triethylamine, dimethylaniline and tributylamine. Suitable inorganic bases include the hydroxides, carbonates, bicarbonates and phosphates of alkaline or alkaline earth metals.

The catalysts which can be employed are those that promote esterification of the hydroxy monomer with the carbonic acid derivative including tertiary amines such as triethylamine, triisopropylamine, N,N-dimethylaniline, quaternary ammonium compounds, such as tetraethylammonium bromide and benzyl trimethylammonium chloride, and quaternary phosphonium compounds such as N-butyltriphenylphosphonium bromide.

I have found that the polyaromatic alkyl methacrylates described above can act as both solvent and plasticizer for PEI and PC simultaneously. This property of PAAM enables formulation of ternary mixtures having fewer than three glass transitions, i.e., two or one at will, depending on the viscosities and quantities of the respective components and the process of mixing.

For example, Table II shows that a 21:49:30 blend of PC/PEI/Pbenzyl MA formed using a Leistritz twin screw as in Example 5 is clear, transparent and displays only one glass transition (170° C.) in marked contrast to PEI/PC blends without PMMA which are two-phase, immiscible blends over a large range of compositions. The example in Table II where the PC/PEI/PAAM ratio was 49:21:30 is a composition having two glass transitions (115° and 190°) which represent the Tg's of PC and PEI, respectively. However the observed Tg values were shifted relative to the glass transitions of pure PC (149°) and pure PEI (216°) or mixtures thereof measured in the absence of PAAM. This result shows that PAAM is acting as a solvent and plasticizer for both engineering resins which allows the use of lower processing temperatures.

Viscosity is an important variable when blending polymers. In general, when a highly viscose resin such as PEI is mixed with a low viscosity resin such as PAAM, the result is often a simple dispersion of the low viscosity component in the high viscosity component. This potential problem did not prevent the formation of a single phase composition where the PC/PEI/PAAM ratio was 21:49:30. But when the PC/PEI/PAAM ratio was 49:21:30 a two-phase mixture was obtained due to the differing viscosities of the components during mixing. In the latter case a one-phase composition could have been obtained if the blending process were conducted in two steps, i.e., if the highly viscous PEI were mixed with the PAAM to obtain a first composition having intermediate viscosity, then mixed with the PC. Using a two-stage mixing process allows the engineering resins to have more equal viscosity values when mixed so that single phase compositions are obtained.

Generally to achieve efficient mixing in blends one must consider not only the volume fraction ratio but also the viscosity ratio at the processing temperature. Thus the product of the viscosity and volume fractions should be equivalent (i.e. $\eta_1\phi_1 \approx \eta_2\phi_2$). A detailed description of the rheological behavior of polymer blends can be found, for example, in Chapter 7 of the book: "Polymer Blends" (Academic Press, New York, 1978).

In the case of PEI/PC/PAAM blends, the viscosities of the PEI and PC are comparable and vary only by a factor of 2 or so. This can be obtained by comparison of melt flow data (ASTM D1238) or by precise melt rheological curves such as $\eta$ vs. frequency at a fixed temperature. The polybenzylmethacrylate of this invention is nearly 100 times more fluid than PC at the processing temperature, again as measured by comparison of the $\eta$ vs. frequency data generated with a RMS-800 Mechanical Spectrometer (Rheometrics, Inc.).

The characteristics of the PEI/PC/PAAM blends of this invention are dependent upon the content of the three components in the mixture, their respective viscosities, and the process by which they are mixed. Generally, all PEI/PC/PAAM alloys of this invention can be made at will and in such a way so as to achieve a set of desired properties. High amounts of PEI in the blend gives rise to higher mechanical properties like tensile strength, flexural strength and creep resistance; and higher thermal properties such as heat deflection temperature. Higher proportions of PC in the blend results in improved stiffness and impact resistance. In addition to providing miscibility, the addition of PAAM also aides in better workability. Thus, these blends can practically overcome the inherent deficiencies of the respective individual components while maintaining compatibility and achieving transparency throughout a wide composition range.

The polymer blends of this invention constitute a new class of polymer alloys having numerous commercial applications owing to both mutual compatibility of the components and the net desirable set of properties which are more favorable than those of any individual component. These blends can be used, for example, in the packaging industry in the form of containers, foils, films, coatings and laminates where the individual components are currently used but they will possess the hereinabove mentioned better set of optical and mechanical properties. Another application for these alloys is in articles requiring excellent thermal and electrical properties together with good transparency. Thus, the materials of this invention may find use in the automotive industry such as for underhood wiring, electrical components, housings, interior decoration and protective components. Still other applications include transformers, dielectric capacitors and printed circuit boards.

The preferred polymer blends of this invention are binary blends of PEI and PAAM and ternary blends containing polycarbonate wherein the mixture contains at least 20 wt % of PAAM. The scope of this invention also includes obvious extensions of these systems including the use of copolymers of PAAM (block, graft, random, etc.) containing enough aromatic alkyl methacrylate monomers to impart thermodynamic miscibility between the copolymer, PEI and/or PC. Suitable comonomers include olefins such as butadiene and isoprene; acrylate and methacrylates such as n-butyl acrylate, hexyl acrylate and lauryl methacrylate; and siloxanes such as dimethylsiloxane; all of which could add toughness due to their elastomeric properties.

Conventional additives or modifiers can be included in the blends as needed, such as fillers, stabilizers, antioxidants, pigments, dyes, impact modifiers and flame retardants. Antioxidants include phenolics, hindered amines, thioesters, and phosphite compounds. Suitable dyes, pigments and special color concentrates include a wide variety of chemical compounds, both organic and inorganic. Leading suppliers include Ferro, Harwick, Ciba-Geigy and Crowley.

Flame retardants include aluminum hydrates, halogenated compounds, antimony trioxide and phosphate esters. They are sold by a wide variety of companies including Mobay, Ferro, Harwick and Akzo.

Ultraviolet stabilizers are quite complex compounds but are generally of the benzophenone, benzotriazole or nickel-organic types. They are sold by Ciba-Geigy, BASF, Ferro, American Cyanamid.

Suitable fillers include aramid fibers, glass fibers, ceramic fibers, metal fibers, carbon fibers, fillers such as glass beads, minerals such as calcium carbonate, kaolin, talc, micas and silicas.

Impact modifiers are selected for specific systems. They are generally classified for use in PVC, styrenics, olefinics, and engineering resins. Examples include MBS modifiers sold by Rohm & Haas and AtoChem for use in PVC, PC and Nylons. Kratons are sold by Shell for use in styrenics and some engineering resins. EPDM rubbers are sold by many for use in polyolefins. PC's are commercially impact modified with either the MBS or Kraton materials.

In order to maintain the transparent nature of this invention, such additives must also be miscible with the polymers. However, one may choose to give up the benefit of transparency for greater improvement in some other property, such as impact strength or tensile strength, through the use of non-miscible additives. Thus, any polymer blend consisting essentially of PEI and PAAM or PEI/PC/PAAM is within the scope of this invention. Typically, any additional material will not exceed 20 weight % of the total weight of all materials.

The mixing of PEI and PAAM can be undertaken by many means, such as co-dissolution in a common solvent as well as various forms of thermal and mechanical processing such as roll milling, blade mixing, screw extrusion and the like. The resultant blend can be further processed/shaped by similarly known methods of extrusion and molding.

The resultant blends are transparent, thermoplastics with a wide range of properties, in particular more favorable properties than those exhibited by either component alone. For example, the thermoplastic processing of polyetherimides can be aided by the presence of polyaromatic alkyl methacrylates with little effect on their beneficial properties. Similarly, the transparency and processability of the polyaromatic alkyl methacrylates can be maintained while greatly increasing their heat and dimensional stability. Thus, the resultant blends of this invention give transparent plastic materials with a wide, diverse range of properties, more favorable properties than those exhibited by either individual material before blending.

The ternary blends containing polyetherimide, polycarbonate and a poly-aromatic-alkyl methacrylate also may include the above-mentioned copolymers of PAAM (block, graft, segmented, random, etc.) and additives such as fillers, stabilizers, antioxidants, pigments, dyes, impact modifiers, etc. In order to maintain the transparent characteristics of these blends, such additives must also be miscible with the ternary blend. One may choose, however, to forego the transparent property, opting for greater improvement in some other property by the use of an immiscible additive. Thus, any blend consisting essentially of polyetherimide, polycarbonate and a poly-aromatic alkyl methacrylate is considered within the scope of this invention. Typically, any additional material will not exceed 20 wt. % based on the combined weight of all other ingredients.

The subject of this invention can be further illustrated with the aid of the following examples which are not intended to be limiting:

EXAMPLE 1

Polyetherimide (Ultem 1000—General Electric) was solution blended in chloroform with polybenzyl methacrylate (Scientific Polymer Products) at various weight ratios and each blend coagulated in isopropanol, filtered and dried under vacuum at 80° C. for several hours. Each blend was then tested by differential scanning calorimetry (DSC) after first being heated to 275° C. to remove any non-equilibrium effects and to simulate melt blending. Compression molded films of these mixtures were highly transparent to the eye. The DSC was run from 25 to 275° C. at 20° C./minute and the glass transition of the mixtures recorded. The results are contained in Table I. The single glass transition exhibited by these blends is consistent with well known behavior for thermodynamically miscible polymer blends.

EXAMPLE 2

Polyetherimide (Ultem 1000—General Electric) was solution blended in chloroform with polyphenyl ethyl methacrylate (Scientific Polymer Products) at various weight ratios and each blend coagulated in isopropanol, filtered and dried under vacuum at 80° C. for several hours. Each blend was then tested by differential scanning calorimetry (DSC) after first being heated to 275° C. to remove any non-equilibrium effects and to simulate melt blending. Compression molded films of these mixtures were highly transparent to the eye. The DSC was run from 25 to 275° C. at 20° C./minute and the glass transition of the mixtures recorded. The results are contained in Table I. The single glass transition exhibited by these blends is consistent with well known behavior for thermodynamically miscible polymer blends.

COMPARATIVE EXAMPLE 1

Polyetherimide (Ultem 1000—General Electric) was solution blended in chloroform with polymethyl methacrylate (Scientific Polymer Products) at various weight ratios and each blend coagulated in isopropanol, filtered and dried under vacuum at 80° C. for several hours. Each blend was then tested by DSC after first being heated to 275° C. as in Example 1. The resultant blends were opaque when compression molded into films and they exhibited two glass transitions as measured by DSC. The DSC results are contained in Table I.

COMPARATIVE EXAMPLE 2

Polyetherimide (Ultem 1000—General Electric) was solution blended in chloroform with polyethyl methacrylate (Scientific Polymer Products) at various weight ratios and each blend coagulated in isopropanol, filtered and dried under vacuum at 80° C. for several hours. Each blend was then tested by DSC after first being heated to 275° C. as in Example 1. The resultant blends were opaque when compression molded into films and they exhibited two glass transitions as measured by DSC. The DSC results are contained in Table I.

TABLE I

| PEI/PAAM | Example 1 | Example 2 | Comp. Ex. 1 | Comp. Ex. 2 |
|---|---|---|---|---|
| 100/0 | 222 | 222 | 222 | 222 |
| 85/15 | 203 | 191 | 107 & 217 | 57 & 219 |
| 70/30 | 182 | 164 | | |
| 60/40 | 177 | 145 | | |
| 50/50 | — | — | 110 & 218 | 60 & 218 |
| 40/60 | 142 | 108 | | |
| 20/80 | — | 40 | 116 & 221 | 78 & 218 |
| 0/100 | 67 | 20 | 106 | 57 |

EXAMPLE 3

Polyetherimide (Ultem 1000—General Electric Corporation), polycarbonate (Lexan 141—General Electric Corporation) and polybenzyl methacrylate (Scientific Polymer Products) having a Tg=62° C. were solution blended in chloroform at various weight ratios and each blend coagulated in isopropanol, filtered and dried under vacuum at 80° C. for several hours. Each blend was then tested by differential scanning calorimetry (DSC) after first being heated to 275° C. under nitrogen to remove any non-equilibrium effects and to simulate melt blending. Compression molded films of these materials were transparent to the naked eye. The DSC was run from 25 to 275° C. at 20° C./minute and the glass transition of the mixtures recorded. The results are contained in Table II. The single glass transition exhibited by these blends is consistent with well known behavior for thermodynamically miscible polymer blends.

EXAMPLE 4

Polyetherimide (Ultem 1000—General Electric Corporation), polycarbonate (Lexan 141—General Electric Corporation) and polyphenyl ethyl methacrylate (Scientific Polymer Products) having a Tg=20° C. were solution blended in chloroform at various weight ratios and each blend coagulated in isopropanol, filtered and dried under vacuum at 80° C. for several hours. Each blend was then tested by differential scanning calorimetry (DSC) after first being heated to 275° C. under nitrogen to remove any non-equilibrium effects and to simulate melt blending. Compression molded films of these materials were transparent to the naked eye. The DSC was run from 25 to 275° C. at 20° C./minute and the glass transition of the mixtures recorded. The results are contained in Table II. The single glass transition exhibited by these blends is consistent with well known behavior for thermodynamically miscible polymer blends.

COMPARATIVE EXAMPLE 3

Polyetherimide (Ultem 1000—General Electric Corporation), polycarbonate (Lexan 141—General Electric Corporation) and polymethyl methacrylate (Scientific Polymer Products) having a Tg=109° C. were solution blended in chloroform at various weight ratios and each blend coagulated in isopropanol, filtered and dried under vacuum at 80° C. for several hours. Each blend was then tested by differential scanning calorimetry (DSC) after first being heated to 275° C. under nitrogen to remove any non-equilibrium effects and to simulate melt blending. Compression molded films of these materials were opaque and exhibited two glass transitions as measured DSC. The DSC was run from 25 to 275° C. at 20° C./minute and the glass transition of the mixtures recorded. The results are contained in Table II.

COMPARATIVE EXAMPLE 4

Polyetherimide (Ultem 1000—General Electric Corporation), polycarbonate (Lexan 141—General Electric Corporation) and polyethyl methacrylate (Scientific Polymer Products) having a Tg=55° C. were solution blended in chloroform at various weight ratios and each blend coagulated in isopropanol, filtered and dried under vacuum at 80° C. for several hours. Each blend was then tested by differential scanning calorimetry (DSC) after first being heated to 275° C. under nitrogen to remove any non-equilibrium effects and to simulate melt blending. Compression molded films of these materials were opaque and exhibited two glass transitions. The DSC was run from 25 to 275° C. at 20° C./minute and the glass transition of the mixtures recorded. The results are contained in Table II.

EXAMPLE 5

Polyetherimide (Ultem 1000), polycarbonate (Lexan 141) and polybenzyl methacrylate having a Tg=62° C. were physically mixed in the proportions shown in Table II and extruded in a Leistritz twin screw at 300° C. The material was pelletized and then inject molded on a Nissei machine at 280° C. The DSC was run for 25° to 275° C. at 20° C./minute and the glass transition recorded in Table II.

TABLE II

| PC/PEI | PAAM | Ex 3 | Ex 4 | Ex 5 | Comp Ex 3 | Comp Ex 4 |
|---|---|---|---|---|---|---|
| 100/0 | 0 | 149° | 149° | 149° | 149° | 149° |
| 70/30 | 0 | 148° + 216° | 148° + 216° | 149° + 216° | 148° + 216° | 148° + 216° |
| 63/27 | 10 | — | — | 140° + 215° | — | — |
| 56/24 | 20 | 148° | 159° | — | — | — |
| 49/21 | 30 | — | — | 115° + 190° | — | — |
| 42/18 | 40 | 128° | 114° | — | 115°, 149° + 215° | 55°, 148° + 218° |
| 50/50 | 0 | 147° + 216° | 147° + 216° | 149° + 216° | 147° + 216° | 147° + 216° |
| 45/45 | 10 | — | — | 128° + 198° | — | — |
| 30/30 | 40 | 146° | — | — | — | — |
| 30/70 | 0 | 144° + 216° | 144° + 216° | 149° + 205° | 144° + 216° | 144° + 216° |

TABLE II-continued

| PC/PEI | PAAM | Ex 3 | Ex 4 | Ex 5 | Comp Ex 3 | Comp Ex 4 |
|---|---|---|---|---|---|---|
| 27/63 | 10 | — | — | 139° + 197° | — | — |
| 24/56 | 20 | — | 149° | — | — | — |
| 21/49 | 30 | — | — | 170° | — | — |
| 18/42 | 40 | 155° | 140° | — | 114°, 140° + 216° | 55°, 151° + 216° |
| 15/35 | 50 | 146° | — | — | — | — |
| 0/100 | 0 | 216° | 216° | 216° | 216° | 216° |

Obviously, numerous modifications and variations of the present invention are possible in light of the above teachings. It is therefor to be understood that within the scope of the appended claims, the invention may be practiced otherwise than as specifically described herein.

What is claimed as new and desired to be secured by Letters Patent of United States is:

1. A resin composition comprising a blend of:
   (I) 1 to 99 wt. % of one or more aromatic polyetherimides of the formula

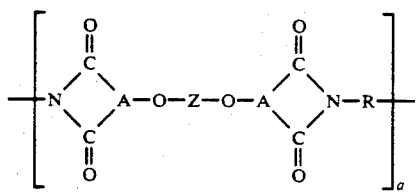

wherein (a) represents a whole number between 1 and 30,000;

O—A is a phenol or naphthyl group selected from

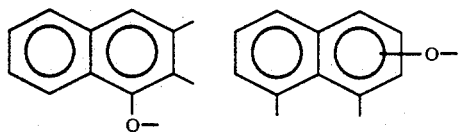

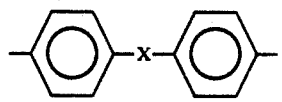

wherein X is $C_1$-$C_6$ straight or branched alkyl, carbonyl, sulfonyl, oxygen or sulfur; R is selected from $C_6$-$C_{20}$-aromatic, $C_1$-$C_6$ alkyl aromatic, biphenyl, phenyl ether and phenyl sulfide;

(II) 99 to 1 wt. % of an aromatic alkyl methacrylate polymer of formula

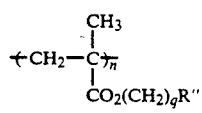

wherein q is an integer of 1 to 4, R" is a phenyl group and n is an integer between 10 and 30,000.

2. The composition of claim 1, comprising 10-90 wt. % of component (I).

3. The composition of claim 1, comprising 35-90% of component (I).

4. The composition of claim 1, wherein said aromatic alkyl methacrylate polymer has a number average molecular weight of 20,000 to 300,000.

5. The composition of claim 1 wherein said polyetherimide has the structure

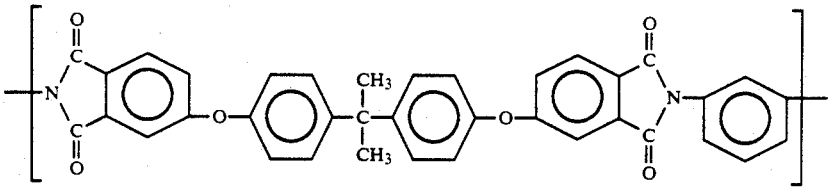

6. The composition of claim 1, further comprising additives or modifiers selected from the group consisting of fillers, stabilizers, anti-oxidants, pigments, dyes and impact modifiers.

7. A resin composition comprising a blend of:
   (I) an aromatic polyetherimide of the formula

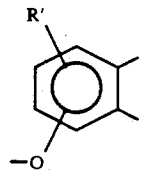

wherein R' is hydrogen, $C_1$-$C_6$ alkyl or $C_1$-$C_6$ alkoxy;

Z is a radical of the formula

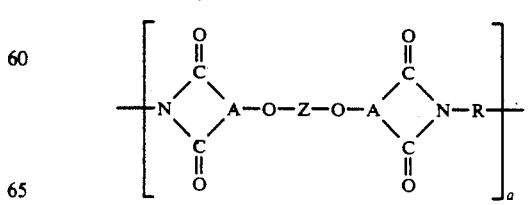

wherein (a) represents a whole number between 1 and 100,000;

O-A is a phenol or naphthyl group selected from

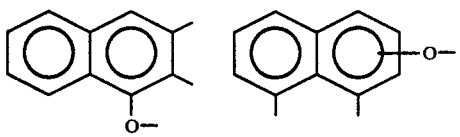

wherein R' is hydrogen, $C_1$-$C_6$ alkyl or $C_1$-$C_6$ alkoxy;
Z is a radical of the formula

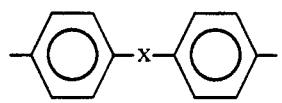

wherein X is straight or branched $C_1$-$C_6$ alkyl, carbonyl, sulfonyl, oxygen or sulfur; R is selected from $C_6$-$C_{20}$-aromatic, $C_1$-$C_6$ alkyl aromatic, biphenyl, phenyl ether and phenyl sulfide;
(II) at least 10 wt. % of an aromatic alkyl methacrylate polymer of formula

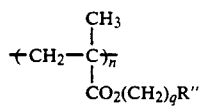

wherein q is an integer of 1 to 4, R" is a phenyl group, n is an integer between 10 and 30,000; and
(III) a polycarbonate of formula

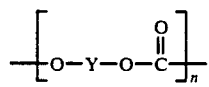

wherein Y is 2,2-bis(4-hydroxy-3-methylphenyl)propane or a divalent aromatic radical of formula

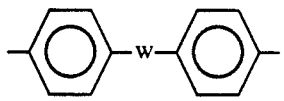

wherein W is $C_1$-$C_6$ straight or branched alkyl, carbonyl, sulfonyl, oxygen, sulfur or a single bond, and n is a whole number between 10 and 30,000.

8. The composition of claim 7, comprising 1-89 wt. % of component (I), 10-98 wt. % of component (II) and 1-89% of component (III).

9. The composition of claim 7, comprising 1-79 wt. % of component (I), 20-98 wt. % of component (II) and 1-79 wt. % of component (III).

10. The composition of claim 7, wherein said polyaromatic alkyl methacrylate has a number average molecular weight of 20,000 to 300,000.

11. The composition of claim 7, wherein said polyetherimide has the structure

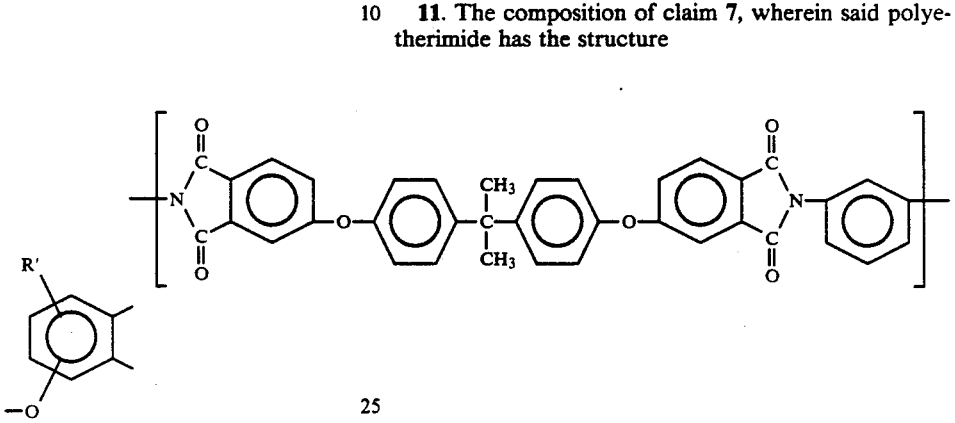

12. The composition of claim 7, further comprising one or more additives or modifiers selected from the group consisting of fillers, stabilizers, anti-oxidants, pigments, dyes and impact modifiers.

13. The composition of claim 7 wherein Y is selected from the group consisting of 2,2-bis(4-hydroxyphenyl)propane, bis(4-hydroxyphenyl)methane, 2,2-bis(4-hydroxy-3methylphenyl)propane.

14. A process for producing a thermodynamically miscible blend of polyetherimide and aromatic polycarbonate resins comprising:
mixing an aromatic polyetherimide of the formula

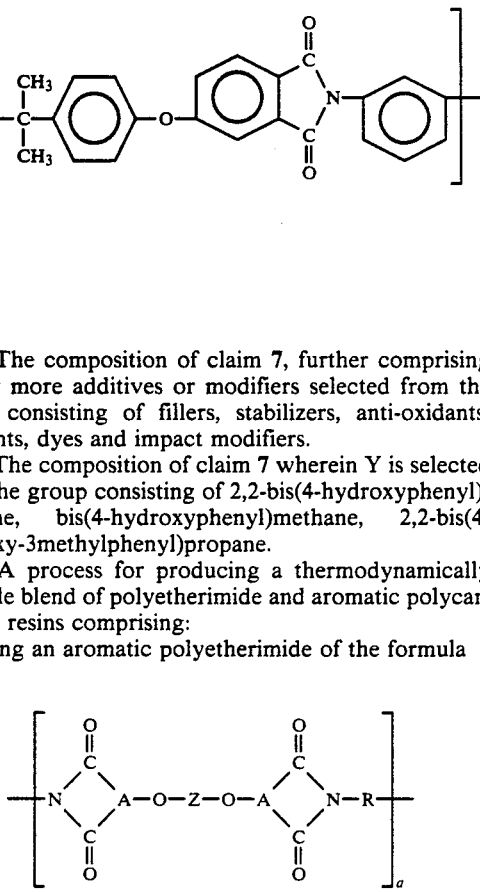

wherein (a) represents a whole number between 1 and 100,000;
O-A is a phenol or naphthyl group selected from

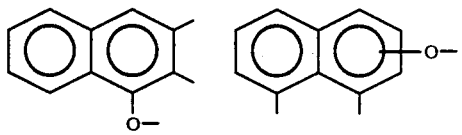

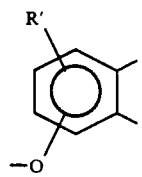

wherein R' is hydrogen, $C_1$-$C_6$ alkyl or $C_1$-$C_6$ alkoxy; Z is a radical of the formula

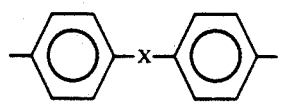

wherein X is $C_1$–$C_6$ straight or branched alkyl, carbonyl, sulfonyl, oxygen or sulfur; R is selected from $C_6$–$C_{20}$-aromatic, $C_1$–$C_6$ alkyl aromatic, biphenyl, phenyl ether and phenyl sulfide;
with an aromatic alkyl methacrylate polymer of formula

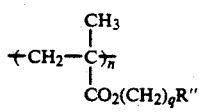

wherein q is an integer of 1 to 4, R″ is a phenyl group, n is a whole number between 10 and 30,000; to obtain a first composition, then adding a polycarbonate of formula

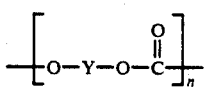

wherein n is a whole number between 10 and 30,000, Y is 2,2-bis(4-hydroxy-3-methylphenyl)propane or a divalent aromatic radical of formula

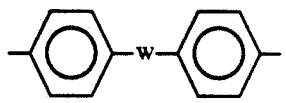

wherein W is a $C_1$–$C_6$ straight or branched alkyl, carbonyl, sulfonyl, oxygen, sulfur or single bond, to obtain a thermodynamically miscible mixture; wherein the amount of aromatic alkyl methacrylate polymer is at least 20 wt. % based on the total weight of polyetherimide and polycarbonate.

15. The process of claim 14, wherein Y is 2,2-bis(4-hydroxyphenyl)propane.

16. The process of claim 14, wherein said aromatic alkyl methacrylate polymer has a number average molecular weight of 20,000 to 300,000.

17. The process of claim 14, wherein said polyetherimide has the structure

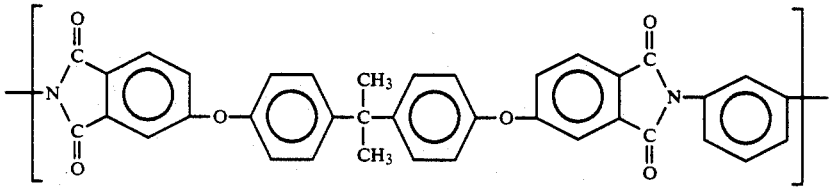

18. The process of claim 14, wherein Y is selected from the group consisting of 2,2-bis(4-hydroxyphenyl)propane, bis(4-hydroxyphenyl)methane, 2,2-bis(4-hydroxy-3-methylphenyl)propane.

* * * * *